(12) United States Patent
Runyon et al.

(10) Patent No.: US 7,023,643 B2
(45) Date of Patent: Apr. 4, 2006

(54) DETECTING TRANSDUCER POSITION PRECISELY WITH A REUSABLE SENSOR ASSEMBLY

(75) Inventors: John Frederick Runyon, St. Paul, MN (US); Mark August Toffle, St. Louis Park, MN (US); Brent Melvin Weichelt, Burnsville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 340 days.

(21) Appl. No.: 10/151,493

(22) Filed: May 20, 2002

(65) Prior Publication Data

US 2003/0039055 A1  Feb. 27, 2003

Related U.S. Application Data

(60) Provisional application No. 60/314,039, filed on Aug. 22, 2001.

(51) Int. Cl.
   *G11B 21/10* (2006.01)
(52) U.S. Cl. .................................................. 360/75
(58) Field of Classification Search ................ 360/75, 360/77.03, 78.11
   See application file for complete search history.

(56) References Cited

U.S. PATENT DOCUMENTS

| | | | |
|---|---|---|---|
| 4,831,470 A * | 5/1989 | Brunnett et al. | 360/75 |
| 4,980,783 A | 12/1990 | Moir et al. | 360/75 |
| 5,227,625 A | 7/1993 | Hetzler | |
| 5,325,349 A | 6/1994 | Taniguchi | |
| 5,442,172 A | 8/1995 | Chiang et al. | |
| 5,617,267 A * | 4/1997 | Kawagoe et al. | 360/75 |
| 5,627,698 A * | 5/1997 | Malek | 360/75 |
| 5,642,943 A * | 7/1997 | Szeremeta | 384/100 |
| 5,774,294 A | 6/1998 | Fioravanti | |
| 5,796,542 A | 8/1998 | Szeremeta | 360/75 X |
| 5,991,112 A | 11/1999 | Song et al. | |
| 6,191,911 B1 | 2/2001 | Cai et al. | |

FOREIGN PATENT DOCUMENTS

| | | | |
|---|---|---|---|
| JP | 402033781 A | | 2/1990 |
| JP | 402033781 A | * | 2/1990 |
| JP | 402198078 A | | 8/1990 |
| JP | 402198078 A | * | 8/1992 |
| JP | 404345975 A | * | 12/1992 |
| JP | 404345975 A | | 12/1992 |

OTHER PUBLICATIONS

"Accurate Axis Coupler for Rotary Actuator Control," Oct. 1, 1989, IBM TDB vol. 32, No. 5A, pp. 460-461.*

* cited by examiner

*Primary Examiner*—David Hudspeth
*Assistant Examiner*—James L Habermehl
(74) *Attorney, Agent, or Firm*—David K. Lucente; Derek J. Berger (57) ABSTRACT

A method and apparatus for transducer position detection uses inert contact surfaces to engage an actuator temporarily. The inert contact surfaces are part of an apparatus that also includes an optical sensor such as a retroreflector or diffraction grating. The assembly is thus configured to permit multiple uses while exerting a near-zero net torque about the length of the arm that supports the transducer. This is useful where there is a temporary need for especially precise position control, such as when servowriting a data storage media surface.

30 Claims, 5 Drawing Sheets

DETECTING TRANSDUCER POSITION PRECISELY WITH A REUSABLE SENSOR ASSEMBLY

RELATED APPLICATIONS

This application claims priority of U.S. provisional application Ser. No. 60/314,039 filed 22 Aug. 2001.

FIELD OF THE INVENTION

This application relates generally to position sensing and more particularly to temporarily enhancing the accuracy of position measurements.

BACKGROUND OF THE INVENTION

Disc drives are data storage devices that store digital data in magnetic form on a rotating disc. Modern disc drives comprise one or more rigid information storage discs that are coated with a magnetizable medium and mounted on the hub of a spindle motor for rotation at a constant high speed. Information is stored on the discs in a plurality of concentric circular tracks typically by an array of transducers mounted to a radial actuator for movement of the heads relative to the discs. During a data write operation sequential data is written onto the disc track, and during a read operation the head senses the data previously written onto the disc track and transfers the information to an external environment. Important to both of these operations is the accurate and efficient positioning of the head relative to the center of the desired track on the disc. Head positioning within a desired track is dependent on head-positioning servo patterns, i.e., a pattern of data bits recorded on the disc surface and used to maintain optimum track spacing and sector timing. Servo patterns or information can be located between the data sectors on each track of a disc ("embedded servo"), or on only one surface of one of the discs within the disc drive ("dedicated servo"). Regardless of whether a manufacturer uses "embedded" or "dedicated" servos, the servo patterns are typically recorded on a target disc during the manufacturing process of the disc drive.

Recent efforts within the disc drive industry have focused on developing cost-effective disc drives capable of storing more data onto existing or smaller-sized discs. One potential way of increasing data storage on a disc surface is to increase the recording density of the magnetizable medium by increasing the track density (i.e., the number of tracks per inch). Increased track density requires more closely-spaced, narrow tracks and therefore enhanced accuracy in the recording of servo-patterns onto the target disc surface. This increased accuracy requires that servo-track recording be accomplished within the increased tolerances, while remaining cost effective.

Servo patterns are typically recorded on the magnetizable medium of a target disc by a servo-track writer ("STW") assembly during the manufacture of the disc drive. One conventional STW assembly records servo pattern on the discs following assembly of the disc drive. In this embodiment, the STW assembly attaches directly to a disc drive having a disc pack where the mounted discs on the disc pack have not been pre-recorded with servo pattern. The STW does not use any heads of its own to write servo information onto the data surfaces, but uses the drive's own read/write heads to record the requisite servo pattern to mounted discs.

To facilitate this process, especially in light of track densities now exceeding 100,000 tracks per inch, more accurate positioning is required at a much lower cost. Such positioning requires high quality sensor instruments including an optical sensor. To make such instrumentation cost effective, what is needed is an effective mechanism for key components to be placed temporarily, then removed and reused. The present invention provides a solution to this and other problems, and offers other advantages over the prior art.

SUMMARY OF THE INVENTION

The present invention is a method and apparatus for detecting transducer position precisely using an assembly with at least one inert contact surface for engaging an actuator temporarily. The inert contact surface(s) are part of an assembly that includes an optical sensor for very precise position sensing.

A first preferred embodiment is a device for sensing a position of a transducer of an actuator having an arm with a transducer at its distal end. The device includes a circuit configured for detecting a position of the transducer based on a position-indicative measurement. The device also includes engagement means for supporting the position sensor in a fixed position relative to the actuator while exerting a near-zero net torque about the arm axis.

A second preferred embodiment is a method including a step of bringing the inert contact surface(s) to bear against the actuator. It also includes moving the actuator while the reusable assembly in contact therewith exerts a near-zero net torque about the axis, and subsequently separating the inert contact surface(s) from the actuator.

Additional features and benefits will become apparent upon reviewing the following figures and their accompanying detailed description.

DETAILED DESCRIPTION

Although the examples below show more than enough detail to allow those skilled in the art to practice the present invention, subject matter regarded as the invention is broader than any single example below. The scope of the present invention is distinctly defined, however, in the claims at the end of this document.

Numerous aspects of data storage device technology that are not a part of the present invention (or are well known in the art) are omitted for brevity, avoiding needless distractions from the essence of the present invention. For example, this document does not include much detail about using properly placed optical elements for measuring position. Neither does it include specific methods for seeking or the use of zero acceleration path (ZAP) correction factors. Specific materials for constructing components described herein are likewise typically omitted, being a simple matter of design choice.

Definitions and clarifications of certain terms are provided in conjunction with the descriptions below, all consistent with common usage in the art but some described with greater specificity. For example, an "arm axis" is a line passing through the arm and generally corresponding to its longest dimension. An element that exerts a "near-zero" net torque is one that exerts a torque of at most about 0.04 Newton-meters. (Applicant has ascertained that larger torques induce significant errors when exerted upon an actuator about its arm axes.)

Figure 1:
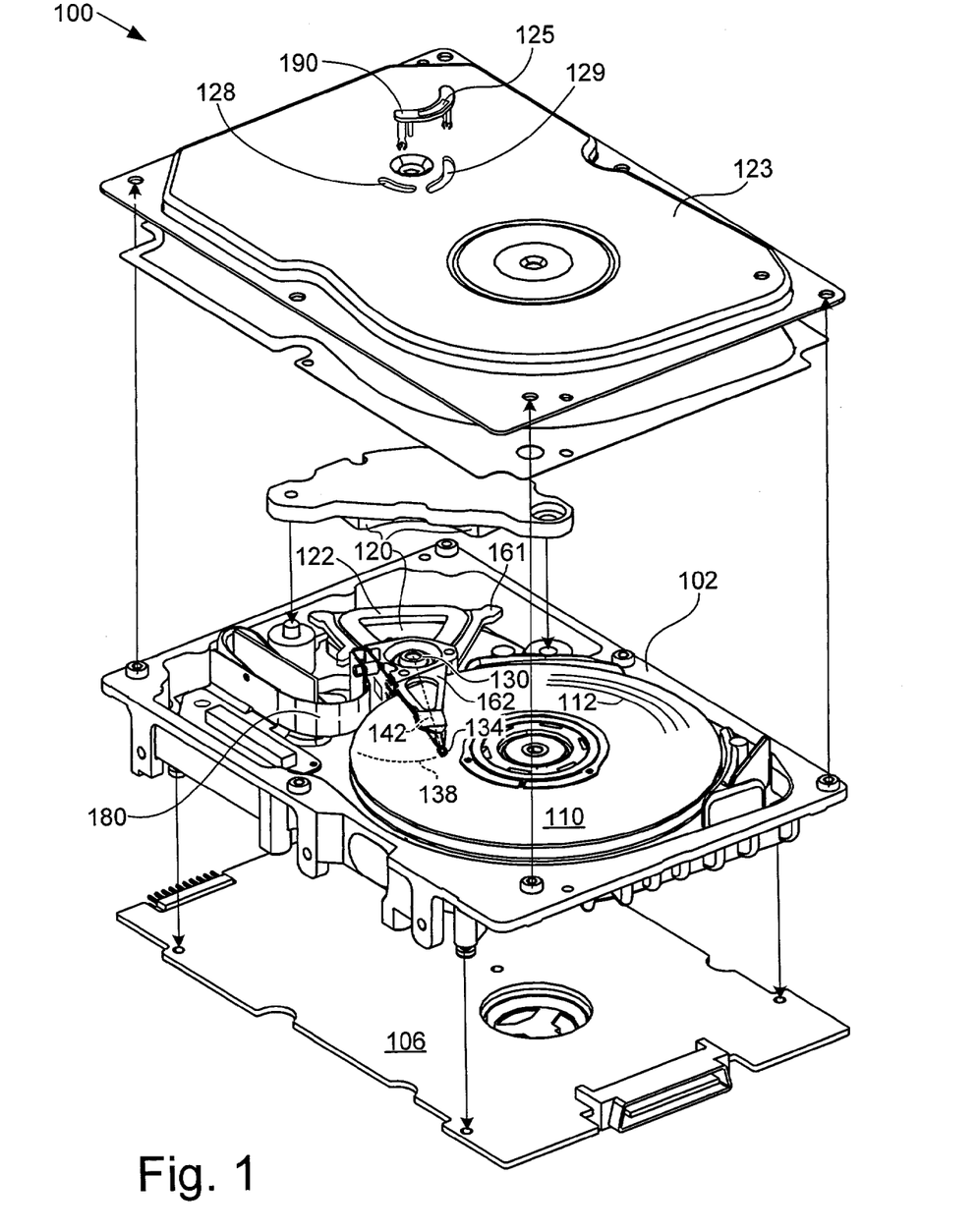
FIG. 1 shows a data storage device constructed in accordance with a preferred embodiment of the present invention.

Turning now to FIG. 1, there is shown a data storage device 100 constructed in accordance with a preferred embodiment of the present invention. Device 100 is a disc drive including base 102 to which various components are mounted. Top cover 123 cooperates with base 102 conventionally to form a sealed chamber. The components include a spindle motor which rotates data storage discs 110 at several thousand revolutions per minute. Information is written to and read from tracks 112 on discs 110 through the use of an actuator assembly 161, which rotates during a seek operation about a bearing shaft assembly 130 positioned adjacent discs 110. Actuator assembly 161 includes a plurality of actuator arms 162 which extend above and below each disc 110, with one or more flexures extending from each of the actuator arms. Each arm has a corresponding axis 142 along its length. Mounted at the distal end of each of the flexures is a transducer head 134 which includes an air-bearing slider enabling transducer head 134 to fly in close proximity above the corresponding surface of associated disc 110.

Servo and user data travels through transducer head 134 and flex cable 180 to control circuitry on controller board 106. Flex cable 180 maintains an electrical connection by flexing as transducer heads 134 traverse tracks 112 along their respective radial paths 138. By "radial," it is meant that path 138 is substantially aligned with a radius of the disc(s) 110, although their directions may be offset from a perfectly radial direction by up to about 20 degrees due to head skew, as is understood in the disc drive industry.

During a seek operation, the overall track position of transducer heads 134 is controlled through the use of a voice coil motor (VCM), which typically includes a coil 122 fixedly attached to actuator assembly 161, as well as one or more permanent magnets 120 which establish a magnetic field in which coil 122 is immersed. The controlled application of current to coil 122 causes magnetic interaction between permanent magn6ts 120 and coil 122 so that coil 122 moves. As coil 122 moves, actuator assembly 161 pivots about bearing shaft assembly 130 and transducer heads 134 are caused to move across the surfaces of discs 110 between the inner diameter and outer diameter of the disc(s) 110. Fine control of the position of head 134 is optionally made with a microactuator (not shown) that operates between the head 134 and the actuator arm.

Arcuate slots 128,129 are provided in top cover 123 so that sensor assembly 190 can be moved (down) into contact with the top surface of actuator assembly 161. Slots 128,129 permit sensor assembly 190 to remain clamped to actuator assembly 161 as it rotates across its entire range of motion (i.e. corresponding to path 138). Diffraction grating 125 affixed onto sensor assembly 190 is used to generate an extremely accurate position indication of head 134 as head 134 writes servo marks onto discs 110. Then, sensor assembly 190 disengages from actuator assembly 161, and slots 128,129 are covered (e.g. by tape).

Figure 2:
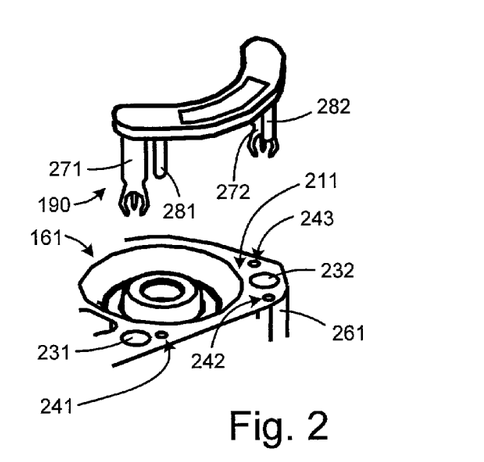
FIG. 2 shows a more magnified view of sensor assembly of FIG. 1 as it approaches the top surface of the body of the actuator of FIG. 1.
Figure 4:
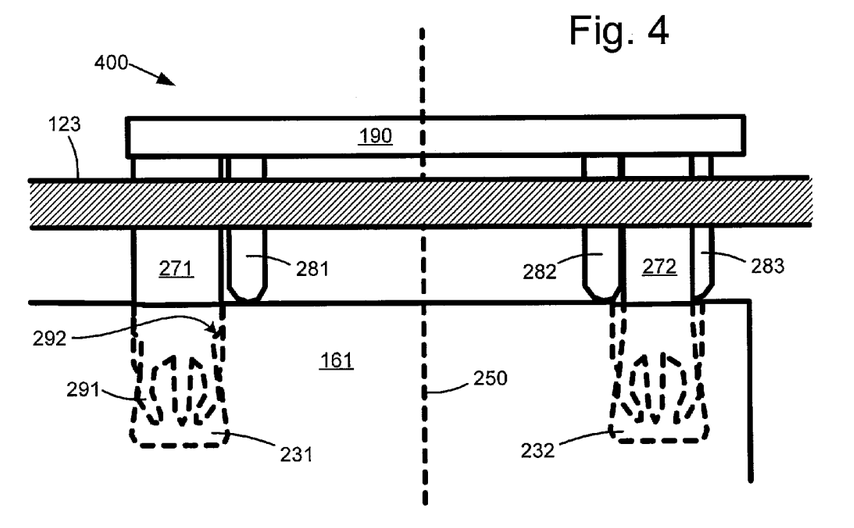
FIG. 4 shows a side view of the configuration of FIG. 3, further magnified and further defining the clamped engagement.

FIG. 2 shows a more magnified view of sensor assembly 190 as it approaches the top surface 211 of the body 261 of actuator 161. (Cover 123 and slots 128,129 are not shown here, for clarity.) This view of sensor assembly 190 shows two clamping rods 271,272 and two precision locator rods 281,282. As the sensor assembly 190 is lowered into place, the clamping rods 271,272 enter corresponding recesses 231,232 formed in the top surface 211 of actuator body 261. Recesses 231,232 are axially symmetric, formed by a tapered bore as shown in FIG. 4. As the sensor assembly is clamped into place, locator rods 281,282,283 simultaneously come into contact with three positions 241,242,243 on the flat portion of the top surface 211. (Note that the rear locator rod 283 is obscured behind clamping rod 272, but is shown in FIG. 4.)

Figure 3:
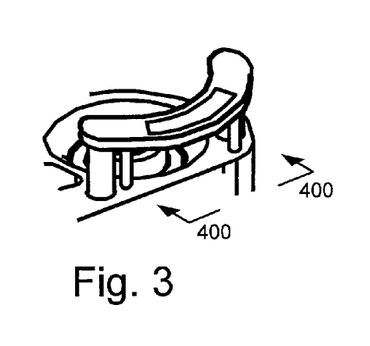
FIG. 3 shows the sensor assembly and actuator of FIG. 2 clamped together.

FIG. 3 shows sensor assembly 190 affixed onto actuator assembly 161. The blunt ends of all three locator rods 281,282,283 contact top surface 211, effectively preventing sensor assembly 190 from tilting or sliding downward under normal (servowrite) operating conditions. FIG. 3 also identifies a side view 400 of sensor assembly 190 engaging actuator assembly 161.

FIG. 4 shows side view 400, further magnified and further defining the engagement. Prongs 291 of clamping rods 271,272 each engage a tapered portion of corresponding recesses 231,232, effectively preventing sensor assembly 190 from sliding upward (i.e. under normal operating conditions). Shoulder 292 around the entire circumference of clamping rod 271 provides for a friction fit with an upper portion of recess 231, effectively preventing lateral movement of rod 271 relative to actuator assembly 161. A similar shoulder around opposing sides of clamping rod 272 effectively prevents sensor assembly 190 from pivoting about recess 231. Note that the shoulder of clamping rod 272 is not visible in FIG. 4 because it does not extend to the sides of rod 272 that are nearest and farthest from rod 271. The absence of a shoulder on two sides of rod 272 permits effective engagement despite thermal and manufacturing variations in the relatively large distance between the clamping rods 271,272.

All of the rods 271,272,281,282,283 of sensor assembly 190 are made of a resilient metal, preferably stainless steel. All of the surfaces of sensor assembly 190 that contact actuator assembly 161 are inert (i.e. not reliant on adhesives or prone to leaving deposits of problematic impurities). To further guard against sensor assembly becoming dislodged during a shock, sensor assembly 190 desirably has a rotational inertia less than 1% of that of actuator assembly 161 about their mutual axis of rotation 250.

Figure 5:
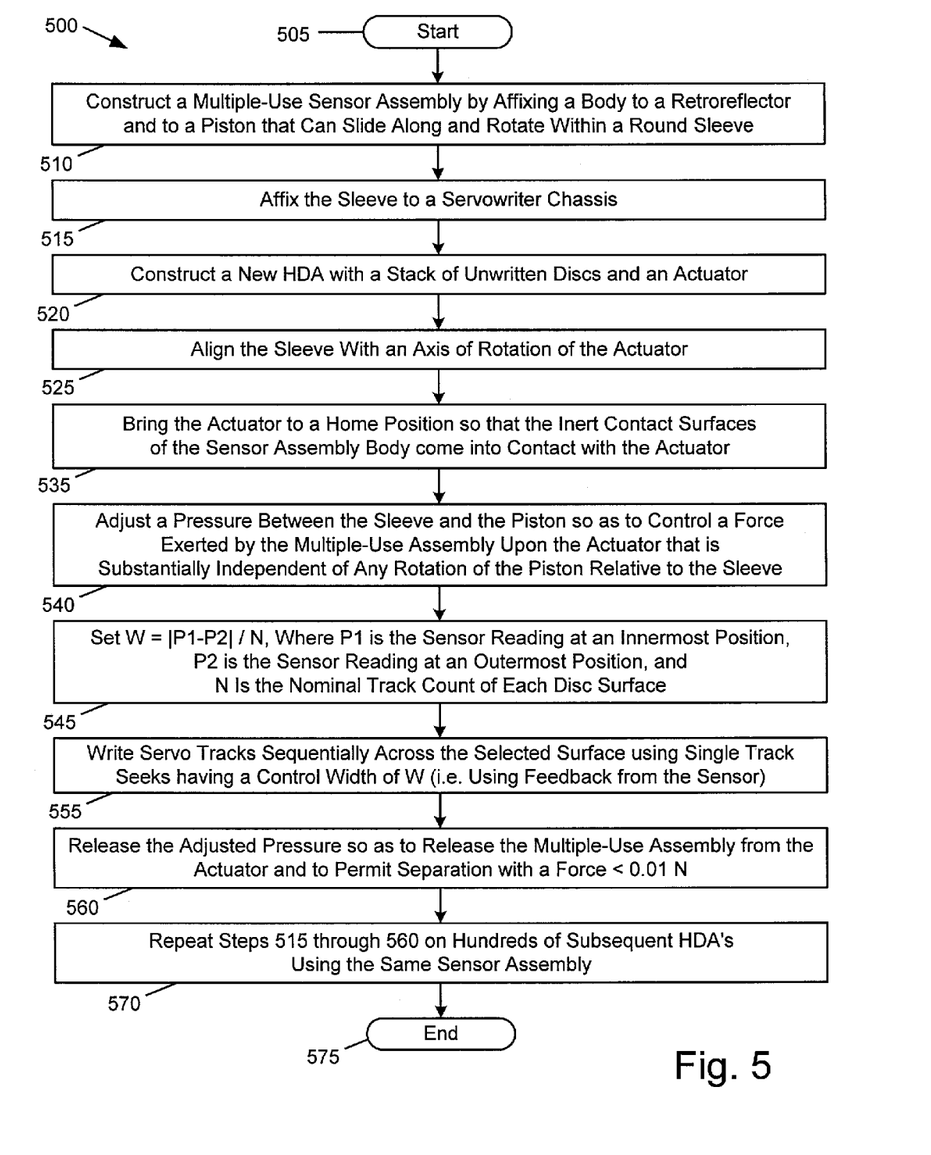
FIG. 5 shows a detailed flowchart of a method of the present invention.

FIG. 5 shows a method 500 of the present invention comprising steps 505 through 575. A reusable sensor assembly is constructed by affixing a body to a retroreflector and to a piston that can slide along and rotate within a cylindrical sleeve 510. Suitable high precision pistons and sleeves can be purchased from Airpot Corporation in Norwalk, Conn. As literature from that company shows, the piston and sleeve act as a U-joint, permitting two rotary elements to rotate together despite imperfect axial alignment. By pressurizing the chamber between the piston and sleeve, moreover, the sensor assembly body can be urged against the actuator body.

After affixing the sleeve to the STW chassis 515 and constructing the HDA 520, the airpot is aligned with the actuator 525. With the HDA actuator at a home position 535, the actuator is brought into contact with the sensor assembly body 535. This is analagous to the coupling step illustrated in FIGS. 2&3. As explained above, the airpot is pressurized to urge inert surfaces of the sensor assembly against the actuator 540. This permits the sensor assembly to remain against the actuator without clamping and while exerting a near-zero torque on the actuator arms (i.e. about their respective axes). After calibrating the sensor 545, the sensor is used to control servo track writing 555 over the rest of the HDA (which my have several data surfaces). The airpot pressure is released to permit easy disengagement 560. The reusable sensor assembly is then re-used 570 many times before a re-build is necessary.

Figure 6:
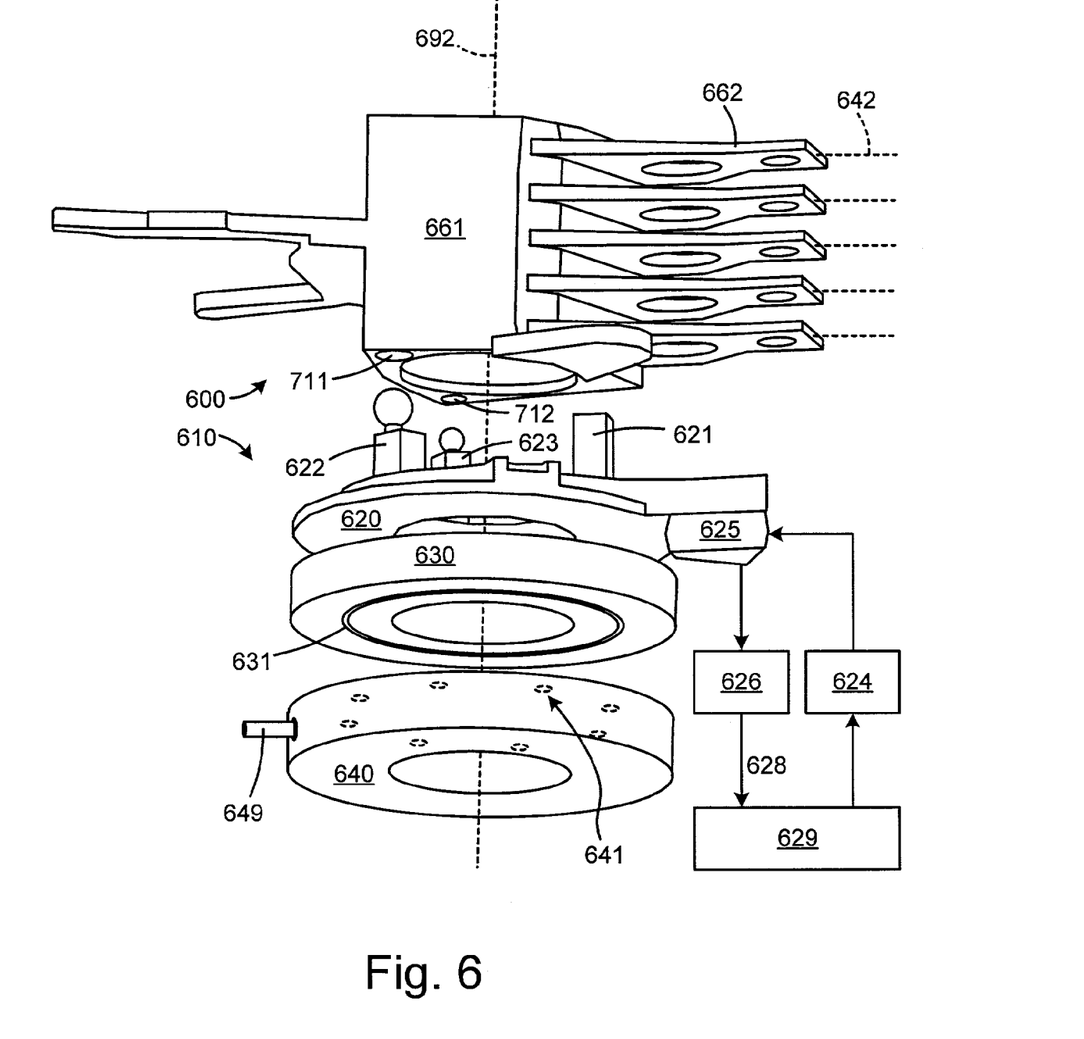
FIG. 6 is a partially exploded view showing how another reusable apparatus of the present invention engages a bottom surface of an actuator of another disc drive.

FIG. 6 is a partially exploded view showing how another reusable apparatus 610 of the present invention engages a bottom surface of an actuator 661 of another disc drive 600. Actuator 661 has five arms as shown, each of which can support one or two heads. Inert contact surfaces on the tops of three posts 621,622,623 protrude upward from contact element 620. Retroreflector 625 is glued to contact element 620 (as shown), as is ring 630 (shown not in contact). Hollow element 640 is rigidly supported on a chassis of a servo track writer (not shown). When actuator 661 is properly aligned with contact element 620 (as shown), the two round post ends enter recesses in actuator 661, as shown. The housing of disc drive 600 is held in a fixed position relative to the servo track writer and hollow element 640. This substantially limits actuator 661 from all but one degree of motion (i.e. rotating about its axis). A gas such as air is pumped into inlet 649, increasing pressure at the eight outlets 641 until ring 630 separates from hollow element 640. Groove 631 equalizes pressure about the axis of rotation 692, tending to create a uniform flow that causes ring 630 to float.

Figure 7:
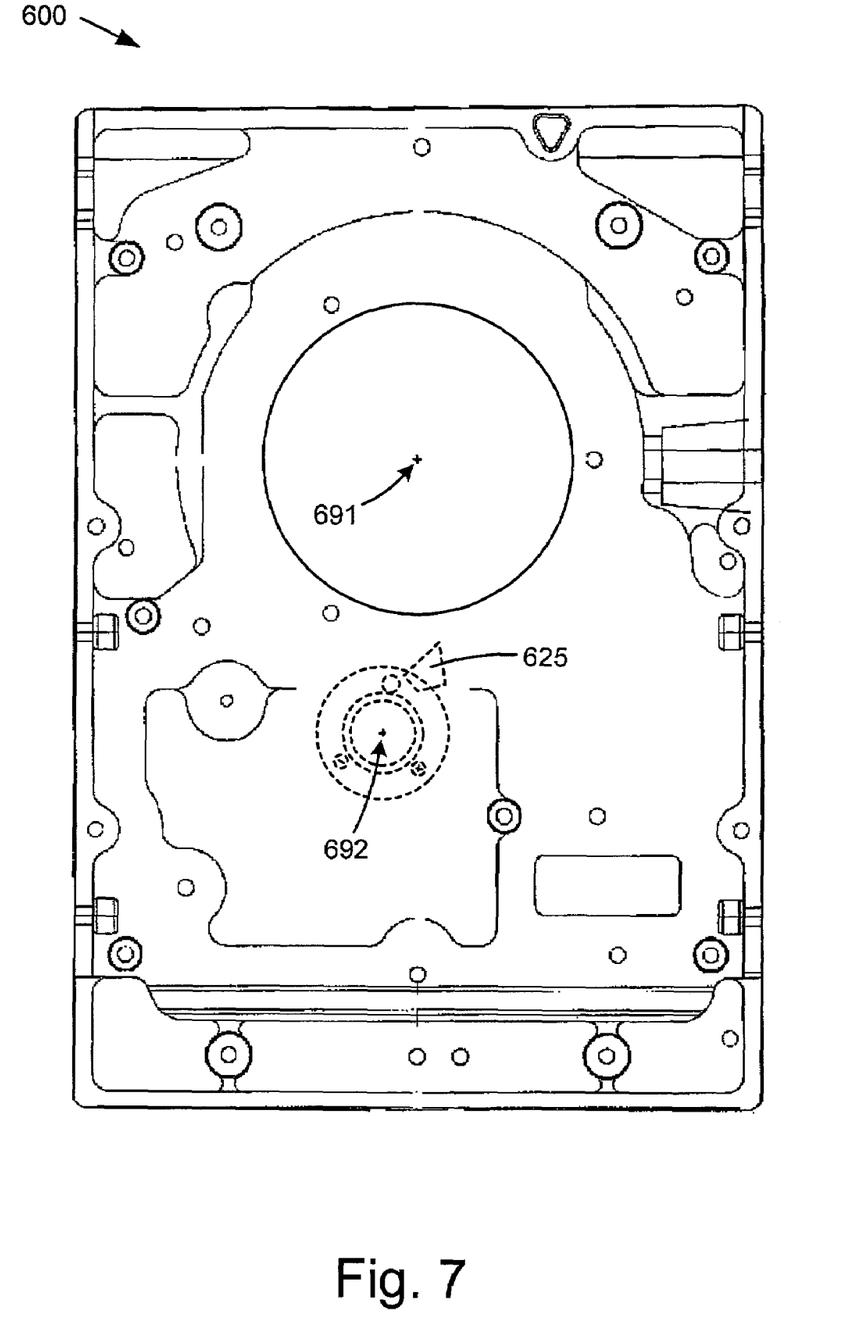
FIG. 7 shows a top view of the disc drive of FIG. 6.

For positive engagement, a first recess 711 in actuator uses a conical taper which self aligns with post 622. A second recess 712 uses a groove aligned with post 623 and generally toward post 622 so as to self-align despite some spatial variation between posts 622 and 623. Post 621 has a flat bottom that simply comes to rest on a flat portion of actuator 661 (not self-aligning, except vertically).

During operation, circuit 629 activates emitter 624, which emits light into retroreflector 625 with a known direction. Depending on the position of retroreflector 625, it reflects the light to a different position on receptor 626. Receptor 626 thereby generates a signal 628 indicative of that position back to circuit 629. Further details for using optical elements for measuring position are taught in U.S. Pat. Nos. 5,227, 625; 5,442,172; and 5,796,542.

FIG. 7 shows a top view of disc drive 600, showing the horizontal positions of some key elements. Similar to that of FIG. 1, a disc stack rotates about axis 691. Actuator 661 rotates about axis 692. With reusable apparatus 610 held in alignment and contact with actuator 661 as indicated in FIG. 6, retroreflector 625 is held in rigid contact with actuator 661.

Monitoring the position of retroreflector 625 as actuator 661 moves provides an extremely accurate indication of the position of actuator 661. Yet this configuration does not twist or rock actuator 661 relative to any of the arm axes 642 (shown in FIG. 6) substantially enough to introduce any errors. Moreover, apparatus 610 and hollow element 640 can both be reused on hundreds or thousands of disc drives.

Alternatively characterized, a first embodiment of the present invention is an apparatus (such as 190,610) for detecting a position of a transducer (such as 134) supported by an arm (such as 162,662) of an actuator. The arm has an arm axis (such as 142,642) passing therethrough substantially along a length of the arm. The apparatus includes a circuit (such as 629) configured for detecting a position of the transducer based on a position-indicative measurement (such as 628) of an optical position sensor (such as 125,625). The apparatus also includes engagement means (such as 271,281,610,621) for supporting the position sensor in a fixed position relative to the actuator while exerting a near-zero net torque about the arm axis (such as 142,642).

In a second embodiment, the engagement means is a single-piece rigid element (such as 190) that bears against the actuator in a direction substantially aligned with an axis of rotation (such as 250). To further maintain rigidity, the rigid element operates without making any contact with any protrusion (such as arm 162) of the actuator. Also, the engagement means is configured to engage only one end surface (such as 211) of only one HDA at a time (such as by method 500).

In a third embodiment, the engagement means includes a gas bearing that can exert a force >1 Newton to compress the actuator along the spindle axis (such as 192,692) via several inert contact surfaces (such as those of 621) distributed about the spindle axis. At least one of the inert contact surfaces engages a tapered portion of the interior of a hole (such as 711) in the actuator. Each of the respective forces has a respective component along the spindle axis greater than 0.1 Newtons.

In a fourth embodiment, the engagement means includes an elastic deformation element (such as 291) clamping the position sensor in the fixed position relative to the arm. The engagement means consists of several inert contact surfaces that can be clamped simultaneously (as shown in FIGS. 3& 4) each against a respective predetermined portion of the actuator.

A fifth embodiment of the present invention is a method for transducer position detection method including steps for providing (a) a reusable assembly comprising a position sensor and at least one inert contact surface and (b) an actuator having an arm supporting a transducer (such as by steps 510 and 520). An arm axis (such as 642) passes through the arm, substantially along its length. The contact surface(s) are brought to bear against the first actuator (such as by steps 535,540). When the actuator moves (or is moved such as by a servowriter arm outside the drive), the reusable assembly remains in fixed relation to it while exerting a near-zero net torque about the arm axis. The net torque is more preferably less than 0.02 Newton-meters and most preferably less than 0.01 Newton-meters. This permits accurate position detection with reduced errors and with a readily detachable, reusable assembly.

A sixth embodiment of the present invention is a method including constructing the reusable assembly as a piston that can slide along and rotate within a round sleeve (such as by step 510). The method also includes adjusting a pressure between the sleeve and the piston so as to control a force exerted by the reusable assembly upon the actuator (such as by step 540). In this way, the force is made substantially independent of any rotation of the piston relative to the sleeve. After releasing the adjusted pressure, a very small separation force (>0.01 Newtons) is used to separate the reusable assembly from the actuator (such as by step 560).

A seventh embodiment of the present invention is a servo writing method including calibration steps. The actuator is positioned against mechanical stops at each extreme of its motions, taking a reading of the position sensor at each (such as by step 545). These readings are used to generate a calibration multiplier (such as W) that is used with measurements from the sensor to derive control values. The control values help maintain the selected arm at a desired position during a servo write operation (such as by step 555).

An eighth embodiment of the present invention includes a step of bringing the actuator to a home position at which the transducer is not adjacent any stored user data (such as by step 535). This permits the inert surfaces to engage the actuator at precise, predetermined areas of the actuator (such as 231,241).

All of the structures and methods described above will be understood to one of ordinary skill in the art, and would enable the practice of the present invention without undue experimentation. It is to be understood that even though numerous characteristics and advantages of various embodiments of the present invention have been set forth in the foregoing description, together with details of the structure and function of various embodiments of the invention, this disclosure is illustrative only. Changes may be made in the details, especially in matters of structure and arrangement of parts within the principles of the present invention to the full extent indicated by the broad general meaning of the terms in which the appended claims are expressed. For example, the inert surfaces can be on the insides of clamps configured to engage protrusions on the actuator, rather than on the ends of posts. In addition, although the preferred embodiments described herein are largely directed to disc drives, it will be appreciated by those skilled in the art that many teachings of the present invention can be applied to other applications where fine positioning is needed temporarily, without departing from the scope and spirit of the present invention.

What is claimed is:

1. An apparatus for detecting a position of a transducer supported by an arm of an actuator, the arm having an arm axis passing therethrough substantially along a length of the arm, the apparatus comprising:
   a position sensor; and
   reusable engagement means for temporarily supporting the position sensor in a fixed position relative to the actuator while exerting a near-zero net torque about the arm axis.

2. The apparatus of claim 1, in which the engagement means bears against the actuator in a direction substantially aligned with an axis of rotation about which the actuator is configured to rotate.

3. The apparatus of claim 1, in which the engagement means engages the actuator on an end surface thereof.

4. The apparatus of claim 1, in which the engagement means is configured to engage at most one head-disc assembly (HDA) at a time, and in which the HDA includes the actuator.

5. The apparatus of claim 1, in which the multiple use engagement means is a single-piece rigid element.

6. The apparatus of claim 1, in which the engagement means can operate without making a contact with any protrusion of the actuator.

7. The apparatus of claim 1, in which the actuator is rotatable about a spindle axis, and in which the engagement means can exert a force>1 Newton to compress the actuator along the spindle axis via several inert contact surfaces distributed about the spindle axis.

8. The apparatus of claim 1, in which the actuator is rotatable about a spindle axis, and in which the engagement means comprises several inert contact surfaces that can each exert a respective force upon the actuator, each respective force having a respective component along the spindle axis.

9. The apparatus of claim 1, in which the actuator is rotatable about a spindle axis, and in which the engagement means comprises several inert contact surfaces that can each exert a respective force upon the actuator, each of the respective forces having a respective component along the spindle axis greater than 0.1 Newtons.

10. The apparatus of claim 1, in which the engagement means is configured to engage an interior of a hole in the actuator.

11. The apparatus of claim 1, in which the engagement means is configured to engage a tapered portion of a hole in the actuator.

12. The apparatus of claim 1, in which the position sensor includes a retroreflector.

13. The apparatus of claim 1, in which the circuit includes an optical sensor.

14. The apparatus of claim 1, in which the engagement means comprises a gas bearing.

15. The apparatus of claim 1, in which the engagement means includes an elastic deformation element clamping the position sensor in the fixed position relative to the arm.

16. The apparatus of claim 1, in which the engagement means consists of several inert contact surfaces that can be clamped simultaneously each against a respective predetermined portion of the actuator.

17. The apparatus of claim 1, in which the engagement means bears against the actuator in a direction substantially aligned with a spindle axis, in which the engagement means engages the actuator on an end surface thereof, in which the engagement means is configured to engage at most one head-disc assembly (HDA) at a time, in which the HDA includes the actuator, in which the actuator is rotatable about a spindle axis, in which the engagement means can exert a force>1 Newton to compress the actuator along the spindle axis via several inert contact surfaces distributed about the spindle axis, in which the engagement means comprises several inert contact surfaces that can each exert a respective force upon the actuator, each respective force having a respective component along the spindle axis greater than 0.1 Newtons, in which the engagement means is configured to engage a tapered portion of an interior of a hole in the actuator, in which the position sensor includes a retroreflector, and in which the engagement means comprises an air bearing.

18. An apparatus for detecting the position of an actuator in a data storage device comprising:
    a position sensor comprising a mounting portion configured for a tapered sliding engagement with the actuator for releasably mounting the position sensor to the actuator; and
    a receptor that noncontactingly engages the sensor to generate a signal indicating the position of the actuator.

19. The apparatus of claim 18 wherein the mounting portion comprises a protuberant member and the actuator defines an aperture configured for receivingly engaging the protuberant member.

20. The apparatus of claim 19 wherein the protuberant member defines a tapered leading surface.

21. The apparatus of claim 20 wherein the protuberant member comprises a resilient clamping member.

22. The apparatus of claim 21 wherein the aperture defines a recess for retaining the resilient clamping member.

23. The apparatus of claim 21 wherein the resilient clamping member is configured to make a three-point contacting engagement in the aperture.

24. The apparatus of claim 21 wherein the protuberant member comprises a rigid post and a deformable prong depending from the post.

25. The apparatus of claim 24 comprising three equidistantly spaced prongs.

26. The apparatus of claim 20 wherein the leading surface is spherical.

27. The apparatus of claim 19 wherein the aperture defines a tapered bore.

28. The apparatus of claim 19 comprising a second protuberant member configured for abuttingly engaging the actuator when the protuberant member is receivingly engaged in the aperture.

29. The apparatus of claim 18 wherein the mounting portion is adapted to support the position sensor in a fixed position relative to the actuator while exerting a near-zero net torque.

30. The apparatus of claim 18 wherein the apparatus is reusable.

* * * * *

UNITED STATES PATENT AND TRADEMARK OFFICE
CERTIFICATE OF CORRECTION

PATENT NO. : 7,023,643 B2  Page 1 of 1
DATED : April 4, 2006
INVENTOR(S) : John Frederick Runyon et al.

It is certified that error appears in the above-identified patent and that said Letters Patent is hereby corrected as shown below:

<u>Title page,</u>
Item [75], Inventors, add -- Jason Paul Zimmerman, Sauage, MN (US) --.

Signed and Sealed this

Sixteenth Day of May, 2006

JON W. DUDAS
*Director of the United States Patent and Trademark Office*